(12) United States Patent
Liu et al.

(10) Patent No.: US 10,191,999 B2
(45) Date of Patent: Jan. 29, 2019

(54) TRANSFERRING INFORMATION ACROSS LANGUAGE UNDERSTANDING MODEL DOMAINS

(71) Applicant: MICROSOFT CORPORATION, Redmond, WA (US)

(72) Inventors: Xiaohu Liu, Bellevue, WA (US); Ali Mamdouh Elkahky, New York City, NY (US); Ruhi Sarikaya, Redmond, WA (US); Gokhan Tur, Los Altos, CA (US); Dilek Hakkani-Tur, Bellevue, WA (US); Larry Paul Heck, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 440 days.

(21) Appl. No.: 14/266,253

(22) Filed: Apr. 30, 2014

(65) Prior Publication Data

US 2015/0317302 A1 Nov. 5, 2015

(51) Int. Cl.
*G06F 17/28* (2006.01)
*G06F 17/30* (2006.01)
(Continued)

(52) U.S. Cl.
CPC .... *G06F 17/30976* (2013.01); *G06F 17/2785* (2013.01); *G06F 17/28* (2013.01); *G10L 15/063* (2013.01); *G10L 15/1822* (2013.01)

(58) Field of Classification Search
CPC ......... G06F 17/28; G06F 17/21; G06F 17/218
(Continued)

(56) References Cited

U.S. PATENT DOCUMENTS 8,478,780 B2   7/2013   Cooper et al.
8,504,561 B2   8/2013   Hoad et al.
(Continued)

OTHER PUBLICATIONS

Cheung et al, "Sequence clustering and labeling for unsupervised query intent discovery" Proceeding of the 5th ACM International Conference on Web search and data mining, 2012, pp. 383-392. <http://dl.acm.org/citation.cfm?id=2124342>.*

(Continued)

*Primary Examiner* — Lamont M Spooner
*Assistant Examiner* — Oluwadamilola M Ogunbiyi
(74) *Attorney, Agent, or Firm* — Shook, Hardy & Bacon L.L.P.

(57) ABSTRACT

Aspects of the present invention provide a technique to validate the transfer of intents or entities between existing natural language model domains (hereafter "domain" or "NLU") using click logs, a knowledge graph, or both. At least two different types of transfers are possible. Intents from a first domain may be transferred to a second domain. Alternatively or additionally, entities from the second domain may be transferred to an existing intent in the first domain. Either way, additional intent/entity pairs can be generated and validated. Before the new intent/entity pair is added to a domain, aspects of the present invention validate that the intent or entity is transferable between domains. Validation techniques that are consistent with aspects of the invention can use a knowledge graph, search query click logs, or both to validate a transfer of intents or entities from one domain to another.

21 Claims, 6 Drawing Sheets

(51) Int. Cl.
*G06F 17/27* (2006.01)
*G10L 15/06* (2013.01)
*G10L 15/18* (2013.01)

(58) Field of Classification Search
USPC .............................................. 704/9; 707/736
See application file for complete search history.

(56) References Cited

U.S. PATENT DOCUMENTS

| | | | |
|---|---|---|---|
| 9,256,682 B1* | 2/2016 | Li | G06F 17/30958 |
| 9,424,840 B1* | 8/2016 | Hart | G10L 15/22 |
| 9,471,606 B1* | 10/2016 | Pedregal | G06F 17/30386 |
| 2005/0114802 A1* | 5/2005 | Beringer | G06F 17/30991 |
| | | | 715/700 |
| 2005/0289124 A1* | 12/2005 | Kaiser | G06F 17/3043 |
| 2009/0204605 A1* | 8/2009 | Bai | G06F 17/30654 |
| 2011/0179021 A1* | 7/2011 | Wen | G06F 17/30265 |
| | | | 707/723 |
| 2012/0158633 A1* | 6/2012 | Eder | G06F 19/3437 |
| | | | 706/46 |
| 2012/0259801 A1 | 10/2012 | Ji et al. | |
| 2012/0290293 A1 | 11/2012 | Hakkani-Tur et al. | |
| 2014/0222422 A1* | 8/2014 | Sarikaya | G06F 17/30672 |
| | | | 704/231 |
| 2014/0280144 A1* | 9/2014 | Heit | G06F 17/30598 |
| | | | 707/737 |
| 2014/0280576 A1* | 9/2014 | Cowan | H04L 67/306 |
| | | | 709/204 |
| 2015/0039632 A1* | 2/2015 | Leppanen | G06F 17/30247 |
| | | | 707/748 |
| 2015/0073798 A1* | 3/2015 | Karov | G10L 15/197 |
| | | | 704/245 |
| 2015/0081279 A1* | 3/2015 | Suleman | G06F 17/27 |
| | | | 704/9 |
| 2015/0178273 A1* | 6/2015 | Hakkani-Tur | G06F 17/28 |
| | | | 704/9 |
| 2015/0331866 A1* | 11/2015 | Shen | G06F 17/30861 |
| | | | 707/723 |
| 2015/0331877 A1* | 11/2015 | Lou | G06F 17/30604 |
| | | | 707/722 |

OTHER PUBLICATIONS

Hakkani-Tur et al, "Bootstrapping Domain Detection Using Query Click Logs for New Domains," 12th International Speech Communication Association, Aug. 2011, pp. 709-712. <http://www.isca-speech.org/archive/archive_papers/interspeech_2011/i11_0709.pdf>.*

Yu et al, "RPI-BLENDER TAC-KBP2013 Knowledge Base Population System," Proceeding of Text Analysis Conference, 2013. <http://dl.acm.org/citation.cfm?id=2124342>.*

Anumanchipalli, et al., "Intent Transfer in Speech-to-Speech Machine Translation", In IEEE Spoken Language Technology Workshop, Dec. 2, 2012, 6 pages.

Hakkani-Tur, et al., "A Weakly-Supervised Approach for Discovering New User Intents from Search Query Logs", In Proceeding of the 14th Annual Conference of the International Speech Communication Association, Aug. 25, 2013, 5 pages.

Heck, et al., "Exploiting the Semantic Web for Unsupervised Spoken Language Understanding", In Proceeding of the IEEE Spoken Language Technology Workshop, Dec. 2012, 6 pages.

Bhargava, et al., "Easy Contextual Intent Prediction and Slot Detection", In Proceeding of the IEEE International Conference on Acoustics, Speech, and Signal Processing, May 26, 2013, 5 pages.

Heck, et al., "Leveraging Knowledge Graphs for Web-Scale Unsupervised Semantic Parsing", In Proceeding of the 14th Annual Conference of the International Speech Communication Association, Aug. 25, 2013, 5 pages.

Hakkani-Tur, et al., "Using a Knowledge Graph and Query Click Logs for Unsupervised Learning of Relation Detection", In Proceeding of the IEEE International Conference on Acoustics, Speech, and Signal Processing, May 2013, 5 pages.

Ainsworth, Chris, "Everything You Need to Know to Understand Google's Knowledge Graph ", Published on: Dec. 3, 2013, Available at: http://www.searchenginepeople.com/blog/what-is-google-knowledge-graph.html.

"Tap into the Power of Google's Knowledge Graph with Freebase Data", Retrieved on: Dec. 23, 2013, Available at: https://developers.google.com/freebase/.

"The Knowledge Graph", Retrieved on: Dec. 23, 2013, Available at: http://www.google.co.in/insidesearch/feature/search/knowledge.html.

* cited by examiner

TRANSFERRING INFORMATION ACROSS LANGUAGE UNDERSTANDING MODEL DOMAINS

BACKGROUND

Natural Language Understanding (NLU) systems have been built for specific tasks covering one or more domains. The Air Travel Information System (ATIS) was a large scale effort to build NLU systems covering the air travel and the hotel reservations domains. Later, such systems were built by various groups covering specific tasks. Many of these systems are built in a fully supervised fashion.

An NLU system can be designed for handling only the air travel reservation task in the air travel domain, but a user may expect the system to handle actions the system is not designed to handle, such as checking the flight status. Checking the flight status is related to the original air travel reservation task but not precisely within the air travel reservation domain. The standard approach to solve this problem is to manually redesign the semantic schema for the air travel reservation domain and add new intents and slots to cover the check-flight status function. This requires collecting and annotating additional data and retraining the NLU models, which is time consuming and expensive.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Aspects of the present invention provide a technique to expand coverage provided by existing domain-specific natural language understanding systems (hereafter "domain" or "NLU"). Coverage can be expanded by transferring NLU objects from one domain to another domain after validating that the objects are compatible with the new domain. Different types of objects can be transferred between domains including an individual entity, an entity list, and an intent. When an object is transferred, NLU training data associated with the object can also be transferred to the new domain. The NLU training data can allow the new object to be recognized in the new domain without further training.

Before the new intent, entity, or other information is added to a domain, aspects of the present invention validate that the intent or entity is transferable between domains. Validation techniques that are consistent with aspects of the invention will be described in detail below, but in brief, a knowledge graph, search query click logs, or both can be used to validate a transfer of intents or entities from one domain to another. The search logs can be used to validate the pairing of an intent with a new slot type or entity. At a high level, the frequent occurrence of queries in search logs that include the phrases mapped to the intent and entities paired to a slot can validate the new intent/slot pairing. A Term Frequency Inverse Document Frequency ("TF-IDF") approach may be used to evaluate relationships between entities in a knowledge graph and can be used to correlate a slot with a graph type. Slots from domains having a compatible graph type may be transferred. Both of these approaches are explained in more detail below.

BRIEF DESCRIPTION OF THE DRAWINGS

Aspects of the invention are described in detail below with reference to the attached drawing figures, wherein.

DETAILED DESCRIPTION

Figure 1:
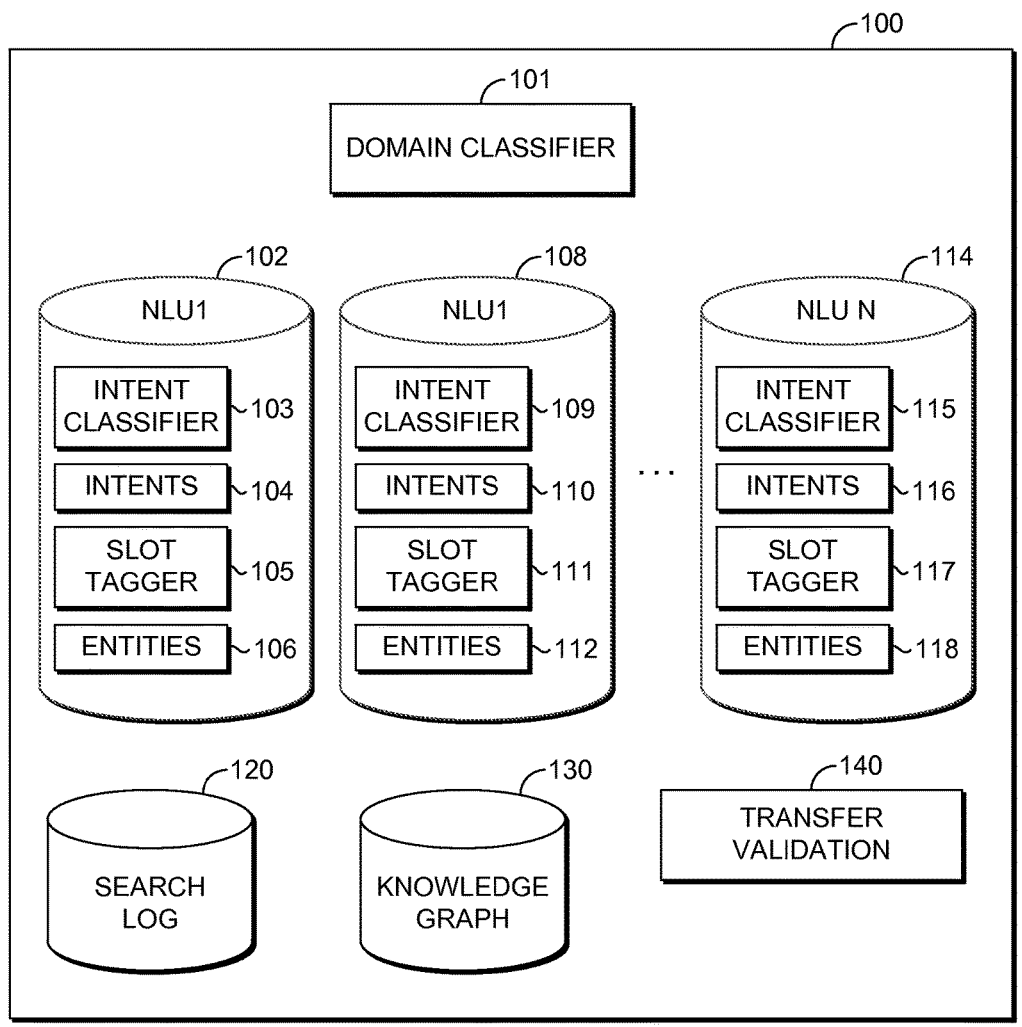
FIG. 1 is a diagram depicting a natural language processing environment, in accordance with an aspect of the present invention.

The subject matter of aspects of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention provide a technique to expand coverage provided by existing domain-specific natural language understanding systems (hereafter "domain" or "NLU"). Coverage can be expanded by transferring NLU objects from one domain to another domain after validating that the objects are compatible with the new domain. Different types of objects can be transferred between domains including an individual entity, a domain specific entity list, an intent, and a slot. When an object is transferred, NLU training data associated with the object can also be transferred to the new domain. The NLU training data can allow the transferred object to be recognized in the new domain without further training. Aspects can use click logs, a knowledge graph, or both to validate that an NLU object can be transferred.

An aspect of the invention enables sharing or transferring NLU objects, such as intents and slots across independently constructed domains. For example, intents from an events domain could be transferred to a places domain. The events domain allows users to "search" and "buy" tickets to concerts, games, and other activities (e.g., "buy a ticket to Justin Timberlake concert in Seattle"). The places domain is where the users can search for businesses and places and ask for phone numbers and driving directions to them. In the events domain, the "get driving directions" or "call business" intents are not covered, but these intents are covered in the places domain. If the user says "get me driving directions to the concert" as a follow up query after purchasing tickets in the event domain, aspects of the invention can be used to automatically cover the new intent "get driving directions" within the event domain by transferring the "get driving directions" intent from the places domain to the event domain. Aspects of the invention can generate candidate intents for transfer and validate the transfer using information from a knowledge graph and/or search records.

Each intent in an NLU can correspond to an action the system executes. Each intent can be associated with one or more slots that can receive one or more inputs used to fetch information from the back-end or show results to the user. The inputs for the slots could be an entity, such as person, place, or thing. NPLs are trained to recognize entities (or other form of input) within natural language input and associate the entities with the appropriate slots. In an aspect, slots associated with a first intent in the first domain are sought to execute the correct system action for an intent in a different domain. In other words, new intent/slot pairs are generated. In the above example of "show me driving directions to <concert event> Justin Timberlake concert <concert event>," "get driving directions" is a new intent transferred to the events domain from the places domain. The "get driving directions" intent takes "address," "location," or "business" as the possible slot types but not the "concert event" slot type in the places domain.

Before the new intent/slot pair is shared or transferred to a domain, an aspect of the present invention validates that the intent or entity is transferable between domains. Validation techniques that are consistent with aspects of the invention will be described in detail below, but in brief, analysis of information in a knowledge graph, search records, or both can be used to validate a transfer of intents or entities from one domain to another. The search logs can be used to validate the pairing of an intent with a new slot type or entity. At a high level, the frequent occurrence of queries in search logs that include the phrases mapped to the intent and entities paired to a slot can validate the new intent/slot pairing. A Term Frequency Inverse Document Frequency ("TF-IDF") approach may be used to evaluate relationships between entities in a knowledge graph and can be used to correlate a slot with a graph type. Slots from domains having a compatible graph type may be transferred. Both of these approaches are explained in more detail below.

Aspects of the present invention may validate the transfer of intents between NLU systems, such as those in the natural language processing environment 100 shown in FIG. 1. From a hardware perspective, the natural language processing environment 100 may comprise one or more computing devices. When multiple devices are included, the computing devices may be geographically distributed, such as in different data centers, and communicatively coupled via a network, such as the Internet. Alternatively, multiple computing devices could be located within a single data center and communicatively coupled via a local area network.

The natural language processing environment 100 comprises a domain classification component 101, domain-specific natural language understanding model NLU A 102 ("domain A"), domain-specific natural language understanding model NLU B 108 ("domain B"), and domain-specific natural language understanding model NLU N 114 ("domain N"). Aspects of the invention are not limited for use in a natural language processing environment 100 with only three domains. For example, suitable natural language processing environments could include 5, 10, 15, 25, or more domains. The natural language processing environment 100 also includes search logs 120, knowledge graph 130, and transfer validation component 140. The transfer validation component's functions will be described below in detail, but in brief, the transfer validation component 140 uses one or more different methods to validate that intents and/or entities from a first domain may be transferred to another domain. In one aspect, the validation component can validate the addition of a single intent to a domain. The validation component 140 may use information from the search logs 120 and/or the knowledge graph 130 to validate transfers and generate candidate entities for validation. Accordingly, features of the domains, search logs 120, and knowledge graph 130 will be introduced before functions of the transfer validation component 140 are explained.

Preliminarily, the domain classification component 101 receives a query and assigns the query to one or more domains for further processing. The domain classification component 101 determines the relationship of a query to the subject matter corresponding to a single domain. Depending on the domain classifier, a variety of evaluation factors may be used by a domain classifier to determine if a query is related to a domain. Some evaluation factors can be related to the keywords or other tokens in the query, possibly including the order of the keywords in the query. Other evaluation factors may be related to a search history context for a user that submitted the query.

The search history context can include search context from within a current search session or browser session or search context over a longer period of time associated with a user. Still other evaluation factors may be related to a user context, such as a geographic location for a user or demographic data for a user. More generally, any type of factor that is used to match a query to a responsive search result can potentially be an evaluation factor for classifying a query relative to a domain.

The domain classification component 101 may include a plurality of domain-specific classifiers. By using a plurality of domain classifiers, each domain classifier can be trained to identify queries that are related to the domain for the domain classifier. Because each domain classifier focuses on a single domain, or possibly a limited number of domains, the domain classifiers for different domains can assign differing weights to the various factors that are considered in classifying a query. In some embodiments, the factors considered by a first domain classifier may be different from the factors considered by another domain classifier for a different domain.

After the domain classifiers have evaluated a query relative to various domains, the result is a group of domain evaluation results that include domain evaluation scores. At this stage, the query can be assigned to an NLU domain for further processing, including intent and slot detection.

NLU domain A 102, NLU domain B 108, and NLU domain N 114 are each trained to understand and respond to commands within fairly narrowly defined domains. Restaurants, Directions, Business, Weather, and Events are all possible domains, each trained to handle tasks relevant to the domain. For example, the restaurants domain may support making reservations at a restaurant, presenting restaurant menus, finding restaurant specials, and such. The directions domain can provide directions to a place/location/address.

An NLU can comprise a plurality of intents (e.g., 104, 110, and 116) and semantic slots that are used to process a user's natural language request. The intents define a task to be performed by the computer and the one or more slots capture information related to the task. The slots may be assigned entities or other information. Each NLU may have a list of entities (e.g., 106, 112, and 118) that are recognizable as compatible slot values. The entities may be derived from a number of sources, including training data, which tag different entities as compatible with a slot. Different intents can have different slots.

When a phrase is recognized in an utterance sent to the domain for evaluation, then the intent associated with the phrase is activated. Each intent can be associated with one or more slots that can receive one or more entities. In one aspect, an intent classifier (e.g., intent classifier 103, 109, or 115) detects intents in an utterance and a slot tagger (e.g., slot tagger 105, 111, or 117) detects entities in an utterance. A group of natural language phrases can be mapped to an individual intent. In one aspect, the mapping is accomplished using a supervised learning process. At a high level, phrases within training data are tagged with different intents and provided to the classifier. Once trained, the intent classifier is able to assign a probability that a given phrase in a query should be assigned a given intent.

The entities in an utterance can be assigned a slot associated with the intent using a tagger that is trained in a manner similar to the intent classifier. An individual entity can be mapped to multiple phrases in an utterance used to identify the entity. For example, in the TV domain, the intent "change.channel" can be associated with the "tv.channel" slot. The "change.channel" intent calls a function for completing the task of changing the TV channel. In the TV domain, a supervised learning approach may be used to build a corpus of natural language phrases that activate or are mapped to the "change.channel" intent. For example, the phrases "change to," "switch channel to," and "turn to" may all be associated with the "channel.change" intent within the TV domain.

The "tv.channel" slot accepts an entity that is recognized by the slot tagger as being associated with a TV channel. For example, the entities "5," "13," "101," and "1541" can be recognized as entities associated with TV channels. Each entity may have a series of natural language expressions associated with it; for example, the entity "channel 5" can be associated with the phrase "5," "channel 5," "ABC," and such within the slot tagger.

Aspects of the invention can add slots or entities to the "change.channel" intent and/or add intents to the "tv.channel" entities to form new intent/slot pairs. Of course, this is just one example domain and one example intent/slot pair from the TV domain. When an intent for a first domain is paired with the slot and entities from a second domain, then the knowledge in the respective intent classifiers and slot taggers can also be transferred. This allows the supervised learning used to recognize intents and fill slots to be leveraged within a new domain without supervised retraining the new domain.

The search logs 120 include a record to search activity gathered by a search engine. The search records can include a record of queries received, results returned in response to the queries, and a record of user interactions (e.g., click logs) with a search result. The abundance of implicitly labeled web search queries in search engines may be leveraged to aid in training classification systems used by the validation component 140 to determine whether an intent should be transferred from one domain to another. Large-scale engines such as Bing® or Google® can log more than 100M search queries per day. Each query in the log may be associated with a set of Uniform Resource Locators (URLs) that were clicked after the users entered the query. This user click information may be used to infer intent or slot labels and, therefore, may be useful when training classifiers. For example, the queries of two users who click on the same URL may have the same intent (e.g., "get directions").

The knowledge graph 130 (also described as relational graphs or relational databases including domain databases, knowledge bases, or similar structured information sources) is a repository for information that can be organized as a semantic graph. In aspects, Freebase could be used as the knowledge graph.

Knowledge graph 130 may comprise a structured semantic knowledge base such as the Semantic Web. The Semantic Web (or similar structured knowledge bases or web-scale semantic graphs) can be represented using the Resource Description Framework (RDF), which is a triple-based structure of association that typically includes two entities linked by some relation and is similar to the well-known predicate/argument structure. An example would be "directed_by (Avatar, James Cameron)." As RDFs have increased in use and popularity, triple stores (referred to as knowledge bases or knowledge graphs) covering various domains have emerged, such as Freebase.org. Knowledge graphs can include one or more sets of triples indicating a relation between two entities (e.g., Avatar—directed by—James Cameron), and which may be compiled into a graph structure.

Knowledge graphs typically contain multiple entities that have relationships with one another. The term entity is broadly defined to include any type of item, including a concept or object, that has potential relationships with other items. For example, an entity may include the movie "Life is Beautiful," the director "Roberto Benigni," and the award "Oscar." These three entities are related, in that the movie "Life is Beautiful" is directed by "Roberto Benigni," and the movie also won an Oscar. Multiple entities related in some manner typically comprise a domain, which may be considered as a category of entities, such as movies, exercise, music, sports, businesses, products, organizations, etc.

The transfer validation component 140 can use several different methods to expand the coverage of an existing domain-specific NLU system. Methods for expanding the coverage of a domain-specific NLU system are described in more detail with reference to FIGS. 3, 4, and 5. One method for expanding the slot types that can serve as acceptable slots for an intent is to determine a graph type within a knowledge graph that has the strongest correlation to a slot. The graph type is correlated to a slot via entities that are appear in both the knowledge graph and are assigned to the slot within the NLU's training data. Once a graph type is assigned to the slot, unknown entities with a compatible graph type, as defined by the knowledge graph, may also be assigned as acceptable slot values for the slot. Compatible graph types can include the same graph type, a child graph type of the assigned graph type, and an attribute of the assigned graph type.

Aspects of the invention can find compatible slot types and sub-types for a given intent using the knowledge graph. The intents in the domains for which labeled data and semantic schema exist form an input for the compatible slot discovery. A ranked list of knowledge graph types for each slot accepted by an intent (i.e., system action) in the domains is retrieved or, if a ranked list does not exist, generated. Non-accepted types that have a weighting similar to the accepted types may be transferred. At least two different methods may be used to assign a rank to a type for a given slot, specifically a weight summation method and a TD/IDF approach can be used. These ranking methods will be described using the example data provided in FIG. 2.

Figure 2:
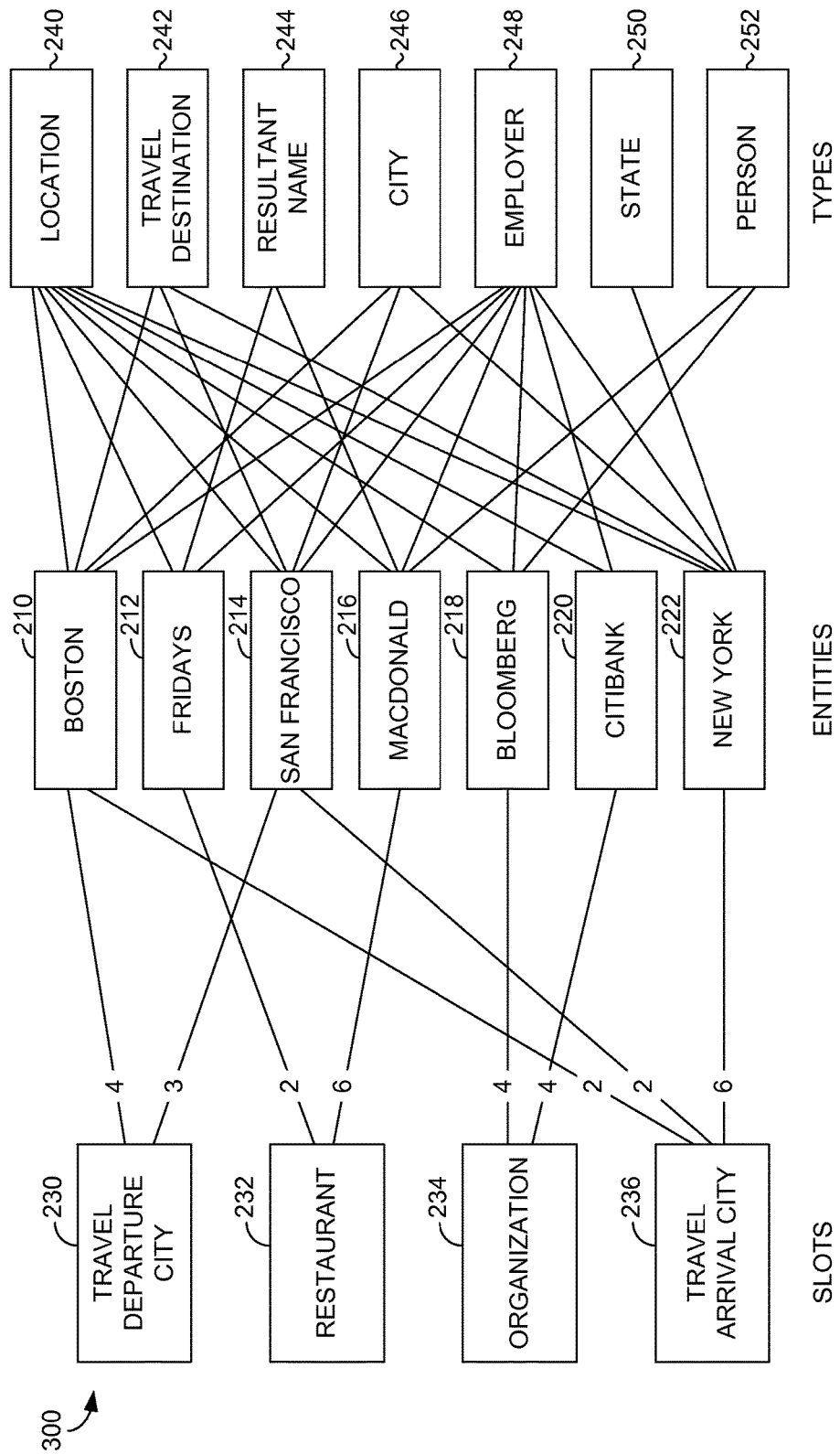
FIG. 2 is a diagram depicting relationships between slots and entities from a natural language domain and entities and entity types in a knowledge graph, in accordance with an aspect of the present invention.

To generate a ranked list, aspects of the invention first take a look at the relationship between slots from the natural language model (e.g., slots 230, 232, 234, and 236), entities (e.g., 210, 212, 214, 216, 218, 220, and 222) mapped to those slots in the natural language model's training data, and entity types (e.g., 240, 242, 244, 246, 248, 250, and 252) from the knowledge graph. Entity types may also be described as graph types herein. For simplicity, FIG. 2 shows a diagram of these relationships for only a few slots, entities, and entity types. An actual analysis could include a large number of slots, entities, and types.

FIG. 2 shows an example list of slots from one or more of the domains. Each slot is connected via lines to one or more entities that appear in those slots in the domain training data. The entities may be gathered from a domain specific entity list. The number within the line equals a number of times each entity appears with each slot within the training data. For example, entity "Boston" 210 is tagged as a "Travel Departure City" 230 four times in the training data, and entity "San Francisco" 214 is tagged as a "Travel Departure City" 230 three times. The training data can be used to train a classifier or tagger to recognize intents or slots. In a supervised learning approach, the training data potentially comprises natural language queries that are manually labeled or tagged. For example, the queries in the training data can comprise phrases that are tagged for association with an intent and an entity that is tagged for a slot associated with the intent.

These entities are connected to the different graph types, as designated in a knowledge graph shown on the right side in the figure. For the entities to have a graph type the entity must be present in the knowledge graph. For example, Boston 210 is an entity of the location type 240, travel destination type 242, city type 246, and employer type 248. Note that an entity can have a large number of types in the knowledge graph. For example, "Chicago" is an entity and it has types (including several not shown in FIG. 2) such as "location," "city," "team location," "travel.destination," "music.record label," "book.subject," and "olympics.bidding city" among others. In one aspect, entities from the NLU that are not included in the knowledge graph are excluded from the analysis.

Ranking Slots by Graph Type

Figure 3:
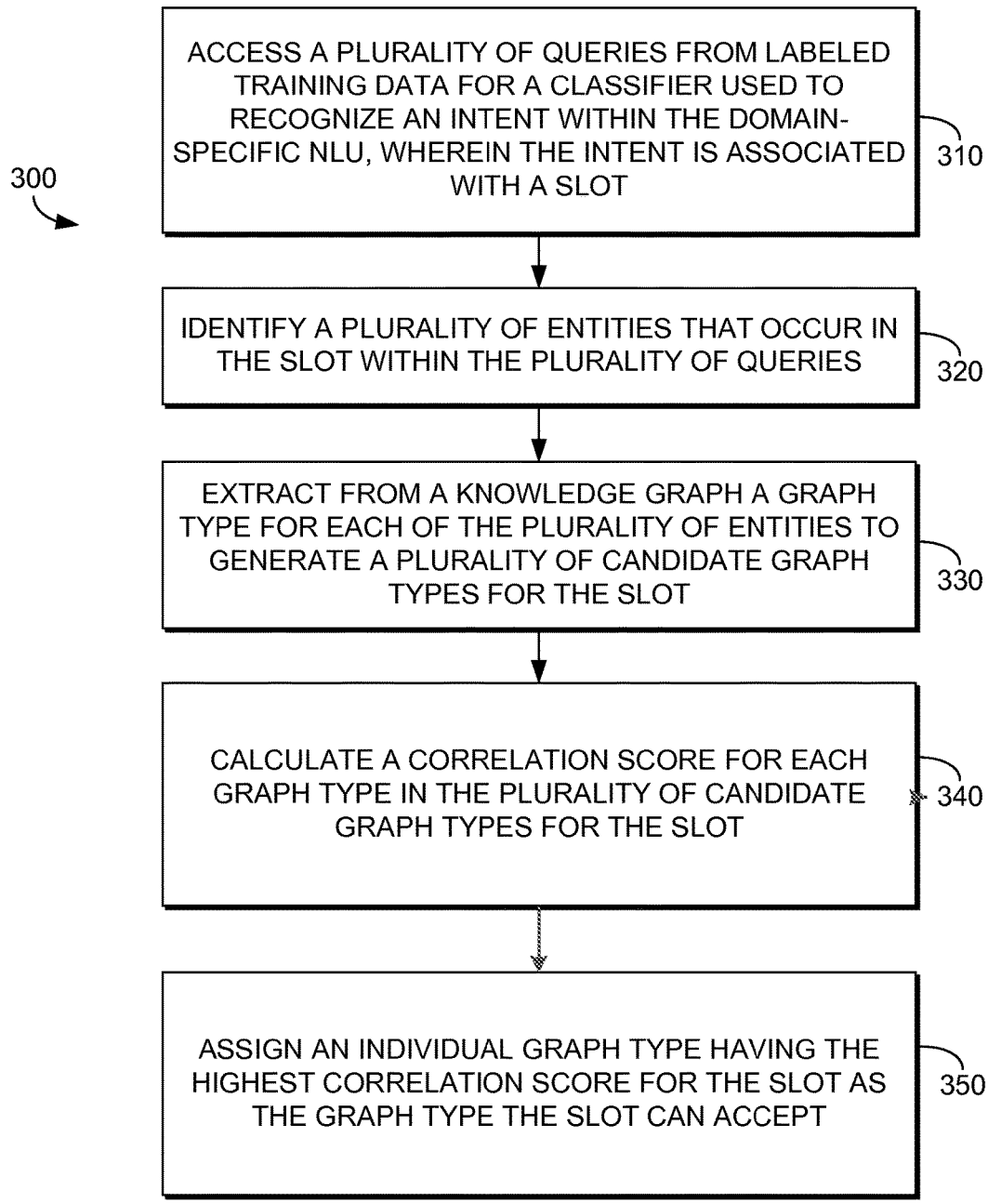
FIG. 3 is a flow chart depicting a method of expanding coverage for a domain-specific natural language understanding ("NLU") system, in accordance with an aspect of the present invention.

Turning now to FIG. 3, a method 300 of expanding slot coverage for a domain-specific natural language understanding ("NLU") system is provided. Method 300 seeks to find additional slot types that are suitable for use with an intent within an NLU. An intent can be associated with one or more slots that receive entities, attributes, or other data. At a high level, method 300 identifies a type for an existing slot associated with an entity by evaluating the type of entities that are currently matched with the slot within the NLU. In one aspect, a supervised learning method is used to associate entities with slots. The goal is to find additional entities with a compatible slot type that can be used with the existing intent.

At step 310, a plurality of queries associated with a given intent is accessed. The given intent is associated with a given slot within the NLU. The queries are from labeled training data for a classifier used to recognize the given intent within the domain-specific NLU system.

At step 320, a plurality of entities that appear as a slot value for the given slot within in the queries associated with the given intent are identified.

At step 330, a plurality of candidate graph types are generated. Wherein the candidate graph types comprise graph types in a knowledge graph that are associated with at least one entity in the plurality of entities.

At step 340, a correlation score for each graph type in the plurality of graph types is calculated. The correlation score measures the relationship between the entities and the slot relative to other entities. The correlation score can be used to rank the different candidate slot types. Aspects of the invention can use different approaches to generate a correlation score and to rank the correlation between graph types and a given slot. Specifically, at least, a weight summation method and a TF-IDF approach can be used, both of which are described in more detail below.

At step 350, an individual graph type having the highest correlation score for the given slot is assigned as the graph type the given slot can accept. Once a graph type is assigned to the slot, compatible graph types may be used with the intent. Compatible graph types include child graph types and attributes. A given graph type can have multiple child graph types and multiple entities.

In the weight summation method, a type i in slot j is weighted using the following expression:

$$S_{i,j} = \sum_{k \in Entities: \exists edge(k,i)} weight_{i,k} \quad (1)$$

where $weight_{i,k}$ is defined by slots and entities in the graph. For example, using data in the graph 200, the score of type "City" 246 in slot "Travel Departure City" 230 is 3+4=7. As can be seen, the slot "Travel Departure City" 230 occurs with entity San Francisco three times and entity San Francisco is of type "City" 246 (among other types). Similarly, Boston 210 is a "Travel Departure City" 230 four times and is also of the type "City" 246. Thus, the score for the slot "Travel Departure City" accepting entities of the type "City" is 7. Notice that the slot "Travel Departure City" would also have the score of 7 for travel destination 242, location 240, and employer 248 because Boston 210 and San Francisco 214 are also of these types. This data suggests that "Travel Departure City" 230 correlates to each of these types with equal weighting. All of the graph types for the slot 230 would receive an equal rank.

To take another example, the score of type "State" 250 in "Travel Arrival City" slot 236 is 6. The score of type "City" 246 in the "Travel Arrival City" slot 236 is 6+2+2=10. This data suggests that "City" 246 correlates more strongly with "Travel Arrival City" slot 236 than "State" 250. Accordingly, the graph type "City" 246 would receive a higher ranking than the entity type "State" 250.

After a slot is assigned a weight summation score for each graph type, the graph type with the highest score can be assigned as the type the slot is able to accept. Entities assigned a compatible type to the type assigned to the slot may then be added to the NLU as acceptable entities for assignment as slot values. In one aspect, entities from different domain-specific NLUs that have a compatible type are added to the target NLU along with training data that can be used to recognize the entity.

The second approach is to weight graph types for all slots jointly by Term Frequency Inverse document frequency ("TF-IDF"). TF-IDF consists of computing Term Frequency (TF) and Inverse document frequency (IDF) and the TF-IDF score is the product of the two.

A vector is generated for each slot j with length equal to a total number of types. The ith component of this vector is assigned to be $S_{i,j}$ which is computed in Eqn. (1). Next, an algorithm similar to the TF-IDF reweighting is applied but with two modifications. The first modification uses the graph types as the terms. The second modification uses slots as the documents. Equations for TF for type t from the knowledge graph and IDF for type t in slot d are as follows:

$$TF(t, d) = 0.5 + \frac{0.5 \, f(t, d)}{\max_{t' \in d} f(t', d)} \quad (2)$$

$$IDF(t) = \log \frac{|D|}{\sum_{d \in D} \mathbb{1}\{t \in d\}} \quad (3)$$

where |D| is the number of slots we have, $\mathbb{1}\{t \in d\}$ is one if type t appears in slot d, and f (t, d) is then the number of times type t appears in slot d.

The basic idea is to rank frequent types higher when the types are specific to a certain slot. For example, the first approach in Eqn. (1) gives graph type "Employer" 248 a score 7 for slot "Travel Departure City" 230, which is the same as types like "City" 246 and "Travel Destination" 242. While in the TF-IDF approach, "Employer" will rank lower for "Travel Departure City," since it is associated with many other slots.

In one aspect, TF-IDF can be further modified to prevent a graph type from being given a low rank because the graph type appears in many similar slots. Using the modified TF-IDF method described above, type "State" 250 in slot "Travel Arrival City" 236 will get a higher rank than type "Travel Destination" 242 because "Travel Destination" 242 appears with two slots (e.g., "Travel Departure City" 230 and "Travel Arrival City" 236) while "State" 250 appears with only one slot (e.g., "Travel Arrival City" 236). To address this issue, IDF can be modified to reduce downweighting of a type that appears in many different slots that are similar. In one aspect, similarity between slot d' and d is measured as the percentage of entities that appear with both slots. For example, entities Boston 210 and San Francisco 214 appear with both slot "Travel Departure City" 230 and slot "Travel Arrival City" 236. New York 222 appears with only "Travel Arrival City" 236. The similarity is denoted by share(d', d). The modified IDF equation becomes:

$$IDF(t, d) = \log \frac{|D|}{\sum_{d' \in D} e^{-\alpha \, shared(d', d)}} \quad (4)$$

where α is a tuning parameter that controls how fast the decay happens. Aspects of the invention can tune by optimizing the type rank performance on a development set of slots, for example five slots. The updated IDF scores are slot specific.

Notice that Eqn. (1) does not assign weights to the edges between entities and different graph types. A simple fix for this is to give a weight that is inversely proportional to the number of graph types appearing with each entity. This has the effect of weighting ambiguous entities (entities with many different graph types) lower than unambiguous ones. In our example, edges between "Boston" and its types will get a weight of ¼ while edges between "New York" and its types take ⅕. This will change f(t,d) used in calculating TF (i.e., Eqn. (2)) to be:

$$f(t, d) = \sum_{e \in entities(d): t \in types(t)} \frac{1}{|N_e|} \quad (5)$$

where $N_e$ is the total number of graph types entity e has. The function entities(d) returns all entities in document d (i.e., slot).

After getting a ranked list of types for each slot using either the first or second method, aspects can use a search algorithm to find the highest ranked entity that may be accepted by an intent. The knowledge graph is used to look up the entity type, parent types, and all of the entity's properties, and return the entity itself or one of its properties (i.e., attributes) that is most compatible with the ranked slot types for the intent. The compatibility may be evaluated with a dot product algorithm, which measures the match between an entity type and the accepted types for the slot.

With the dot product algorithm, existing intents (not transferred) within a domain can accept new slots, which are not covered in the domain's semantic schema. For example, in the TV domain, the semantic schema "change.channel" intent can be paired with a channel entity or network entity. For example, an intent to change channel to CBS may be accepted within the TV domain schema. However, the "change.channel" intent may not be enabled for the "TV show" entity. By transferring the "TV show" entity into the TV domain, the user can say "change channel to Late Night Show" and expect the system to work. Aspects of the invention can now transfer "change.channel" intent to take entity "TV show" since "tv.channel" is an attribute (i.e., property) of "TV show" type in the graph.

Figure 4:
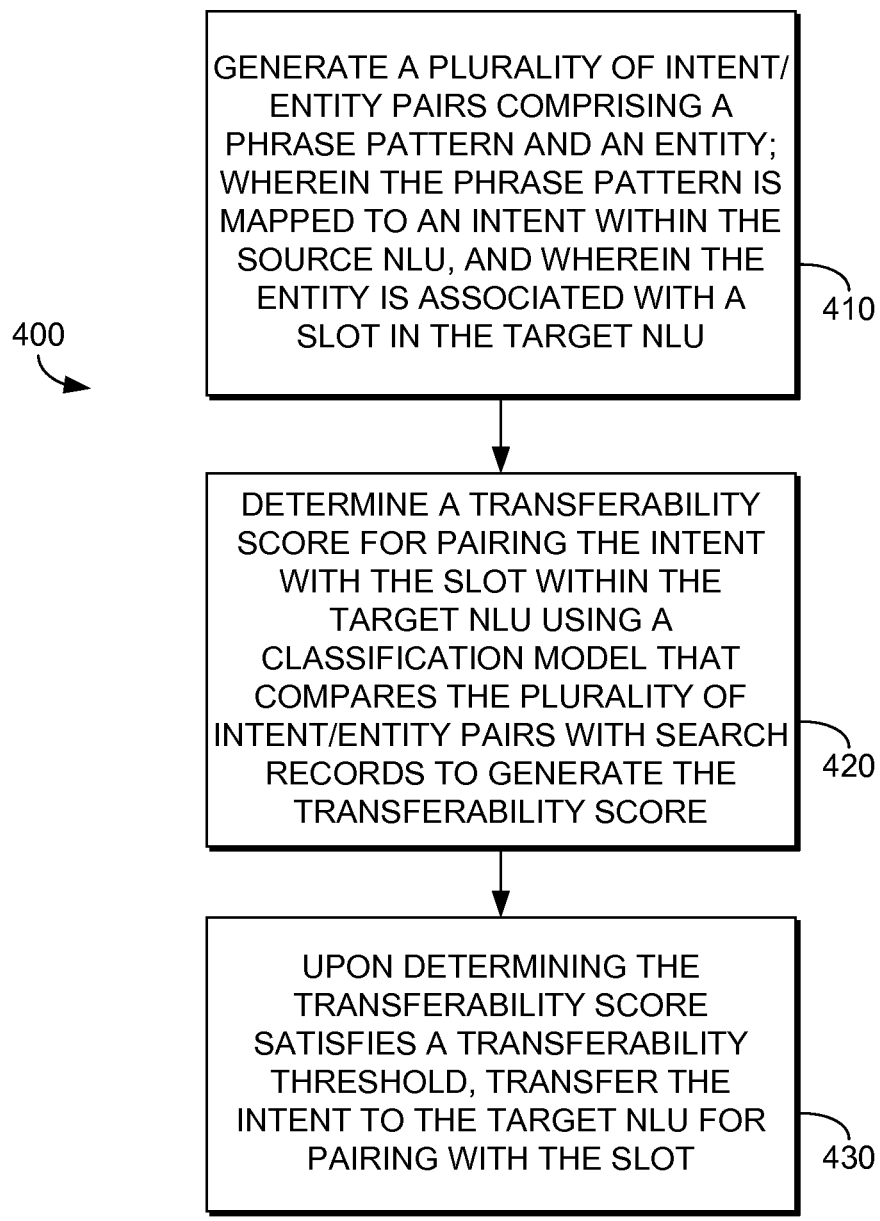
FIG. 4 is a flow chart depicting a method of expanding coverage for a domain-specific natural language understanding ("NLU") system, in accordance with an aspect of the present invention.

FIG. 4 describes a method 400 of validating an intent transfer from a source NLU domain to a target NLU domain to enable a response to a user request that is not actionable by either the source or the target NLU domain in isolation. Aspects of the invention can determine whether intents can be used within other domains and applied to similar or different slot types. Method 400 may be performed by validation component 140 or other components.

At step 410, a plurality of intent/entity pairs are generated comprising a phrase pattern and an entity. The phrase pattern is mapped to an intent within the source NLU and the entity is associated with a slot in the target NLU. The phrase pattern may be associated with the intent through training data that is provided to the source NLU. The training data can comprise queries with the phrase patterns annotated to indicate association with the intent.

The plurality of intent/slot pairs may be generated by accessing a plurality of domain-specific entities from the target NLU domain. Different domains can have different domain-specific entities, and different intents within an NLU can have different domain-specific entities. For a TV listing domain, the domain-specific entities could include the names of television shows. The domain-specific entities may be recognizable by a slot tagger within the domain.

The phrase patterns used in the intent/slot pairs may be gathered by accessing queries and associated intents from the source NLU domain's training data. As mentioned, the training data can comprise labeled queries that express a user intent. Thus, each of the one or more intents can be associated with one or more queries and, by extension, with phrase patterns within the queries.

The phrase patterns may be extracted from the queries using n-gram counts that identify the top patterns. The "top patterns" can have the highest probability of invoking the intent. Possible phrase patterns from the "change.channel" intent in the TV domain can include "change the channel," "watch channel," "switch to channel," "change to channel," and "turn to channel."

As used herein, an n-gram is a subsequence of n elements in a sequence (e.g., a search query). Each of the n elements may be a phoneme, a syllable, a character (e.g., letter or number), a word, etc. It will be recognized that n may be any positive integer (e.g., 1, 2, 3, 4, etc.). For instance, an n-gram for which n:1 is referred to as a unigram; an n-gram for which n:2 is referred to as a bigram; an n-gram for which n:3 is referred to as a trigram, and so on.

Next, a single phrase pattern is combined with a single entity until each phrase pattern extracted from the queries is paired with each domain-specific entity, thereby generating the plurality of intent/slot pairs mentioned in step 410. For example, the phrase pattern "change channel to" can be combined with entity "Friends" (e.g., a TV show) to form the intent/slot pair "change channel to +Friends."

At step 420, a classification model that compares the plurality of intent/entity pairs with search records is used to generate the transferability for pairing the intent with the slot within the target NLU. In one aspect, the search records are click logs. Thus, a single occurrence of the intent/slot pair "change channel to +Friends" could occur when a user clicks on a search result presented in response to a query that includes both "Friends" and the phrase "change channel to." The classification model can take the number of entities that appear in the matched queries into account along with a frequency with which an intent/entity pair matches a query.

The process of building the classifier resembles method 300 in some respects. Initially, the lexical and syntactic patterns that are associated with an intent within the source domain are identified using the following heuristics. For each intent, the top N frequent patterns (i.e., intent patterns) used by this intent are extracted. The top patterns are identified by extracting the most frequent word n-grams that do not contain any slot values (e.g., entities) and contain no more than one stop word. In one aspect, the n-grams are tri-grams.

After top patterns are extracted, a list of entities is collected that appears both in the training data for the source domain and in the target domain to which the intent can potentially be transferred. As mentioned, the list of entities in the training data can be tagged to correspond with different slots. The training data set for the classifier can comprise (intent pattern, entity) pairs manually labeled as valid or invalid. Features from the search results (e.g., number of search results supporting this intent, domain pair, and number of unique entities appeared in the mined queries) can be used as a feature set.

Artificial queries are generated using pairs of a top pattern and an entity (intent pattern, entity). Aspects then mine the search logs to look for evidence that the artificial queries, which can be word n-grams and domains (represented by the entity), are good combinations. For example, a pair of (Places:get phone number, Flights:flight airline) is used to test if "get phone number" can be transferred to "Flights" domain, and (Finance:find stock info, Games:game company) is used to check if "find stock info" can be transferred to "Games" domain.

Note that not all candidate pairs are valid transfers. Some invalid transfer candidates still get nonzero search results because of ambiguous entities. For example, the pair (Movies:find cast, Games:game character) is invalid, but because some movie names are also game characters (e.g., Superman), many matched queries are present in the search logs.

In order to handle the issue of ambiguous entities, aspects can use a list of weighted entities for each domain, where each entity has a score that denotes how likely the entity is within that domain. Such a weighting list can be determined from the knowledge graph or the proposed TF-IDF weighting approach described above. Once trained, the classifier can evaluate new pairs to assign a transferability score.

At step 440, upon determining the transferability score satisfies a transferability threshold, the intent is transferred to the target NLU for pairing with the slot. As mentioned, transferring the intent can include transferring training data used by the source NLU to recognize the intent.

Figure 5:
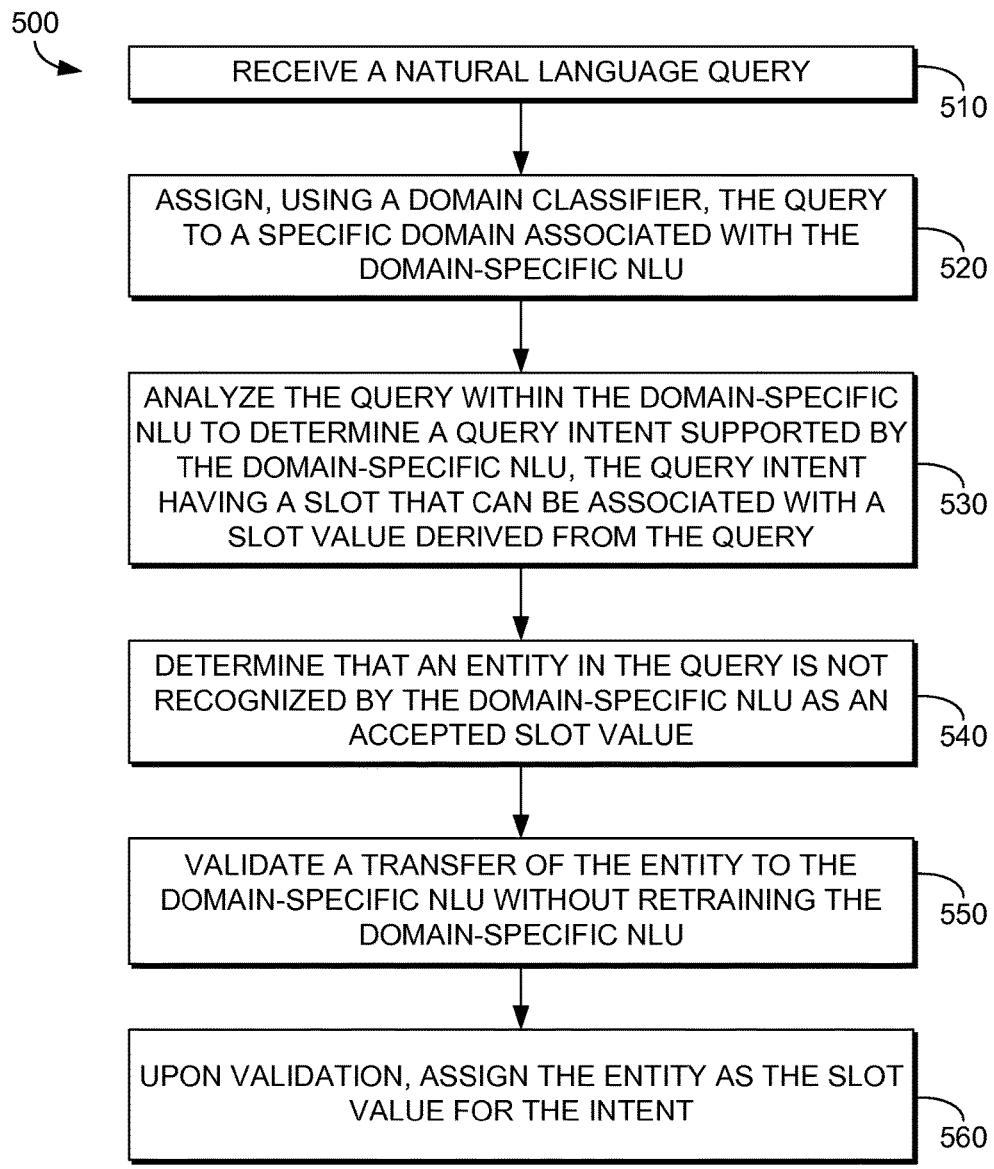
FIG. 5 is a flow chart depicting a method of expanding coverage for a domain-specific natural language understanding ("NLU") system, in accordance with an aspect of the present invention.

Turning now to FIG. 5, a method 500 of expanding slot coverage for a domain-specific natural language understanding ("NLU") system is provided, in accordance with an aspect of the present invention. The NLU system may be used to interpret and respond to a spoken utterance. For example, the NLU system may be used to respond to a query spoken by a person.

At step 510, a natural language query is received. As mentioned, the natural language query may originate with a user speaking to a voice recognition system. The voice recognition system may pass it to a natural language processing system or other components for interpretation and response. An exemplary user query could include "find directions to a Justin Bieber concert."

At step 520, the query is assigned to a specific domain associated with the domain-specific NLU using a domain classifier. For example, the above exemplary query could be assigned to a get "places" domain. The domain classifier can be trained to recognize categories of queries that are passed on for specific domain specific processing. The domain classifier can be similar to domain classification component 101, described above. A natural language processing system can include a plurality of domain-specific NLUs.

At step 530, the query is analyzed within the domain-specific NLU to determine an intent supported by the domain-specific NLU. The query may be analyzed by an intent classifier, such as intent classifier 103. As previously described, the intent can be determined by recognizing a phrase pattern within the natural language query. For example, the phrase pattern "find directions to" or "help me find" could be associated with an intent to receive directions. An individual intent may be associated with multiple phrase patterns. A given natural language domain may be capable of performing tasks related to multiple intents. For example, a places domain may be able to provide directions, provide an address, provide a phone number, and display a location on a map. Each of these intents may be associated with different phrase patterns. The training data used by a classifier can comprise queries that are labeled for specific intents. The classifier then compares new queries to the training data to determine a probability that the query is associated with an intent.

Each intent may have one or more slots for associated information. The associated information can include information used to perform the task. For example, a name of a business or other location may be associated with a "get directions" intent. The slot associated with the "get directions" intent may be able to receive slot values that are a place or can be associated with a place. Thus, each intent can be associated with a slot that takes a slot value satisfying certain criteria. In general, the slot value may be derived from a natural language query. The NLU system may include a list of domain-specific entities that can be slot values for a given slot.

At step 540, an entity in the query is determined to not be recognized by the domain-specific NLU as an accepted slot value. For example, in the above query, Justin Bieber may not be recognized as a suitable place to fill a slot value associated with the "get directions" intent. In one aspect, the entity is not on a domain-specific entity list associated with the slot, and thus, not recognized as an accepted slot value.

At step 550, a transfer of the entity to the domain-specific NLU is validated without retraining the domain-specific NLU. The transfer may be validated using methods described previously, including method 300 and method 400. In one aspect, a knowledge graph is used to determine the graph type for the slot associated with the intent. The graph type may be determined by analyzing slot values associated with the slot in the NLU. For example, graph types of entities in a domain-specific entity list for the slot can be analyzed. Upon determining that the entity is associated with a compatible graph type, the transfer can be validated.

In another aspect, a transferability score for pairing the entity with the slot is determined using a classification model that compares the natural language query with search records to generate the transferability score. The classification model may use a frequency of occurrence of the query or artificial queries comprising intent/entity pairs within search records to determine whether the entity is transferable to the slot. The artificial queries may include phrase patterns mapped to the intent combined with the entity. In general, the occurrence of the query or artificial queries within the search records indicate that the entity is transferable to the slot associated with the intent. In addition, the number of entities associated with phrase patterns mapped to the intent can be considered by a classification model to calculate the transferability score.

Exemplary Operating Environment

Figure 6:
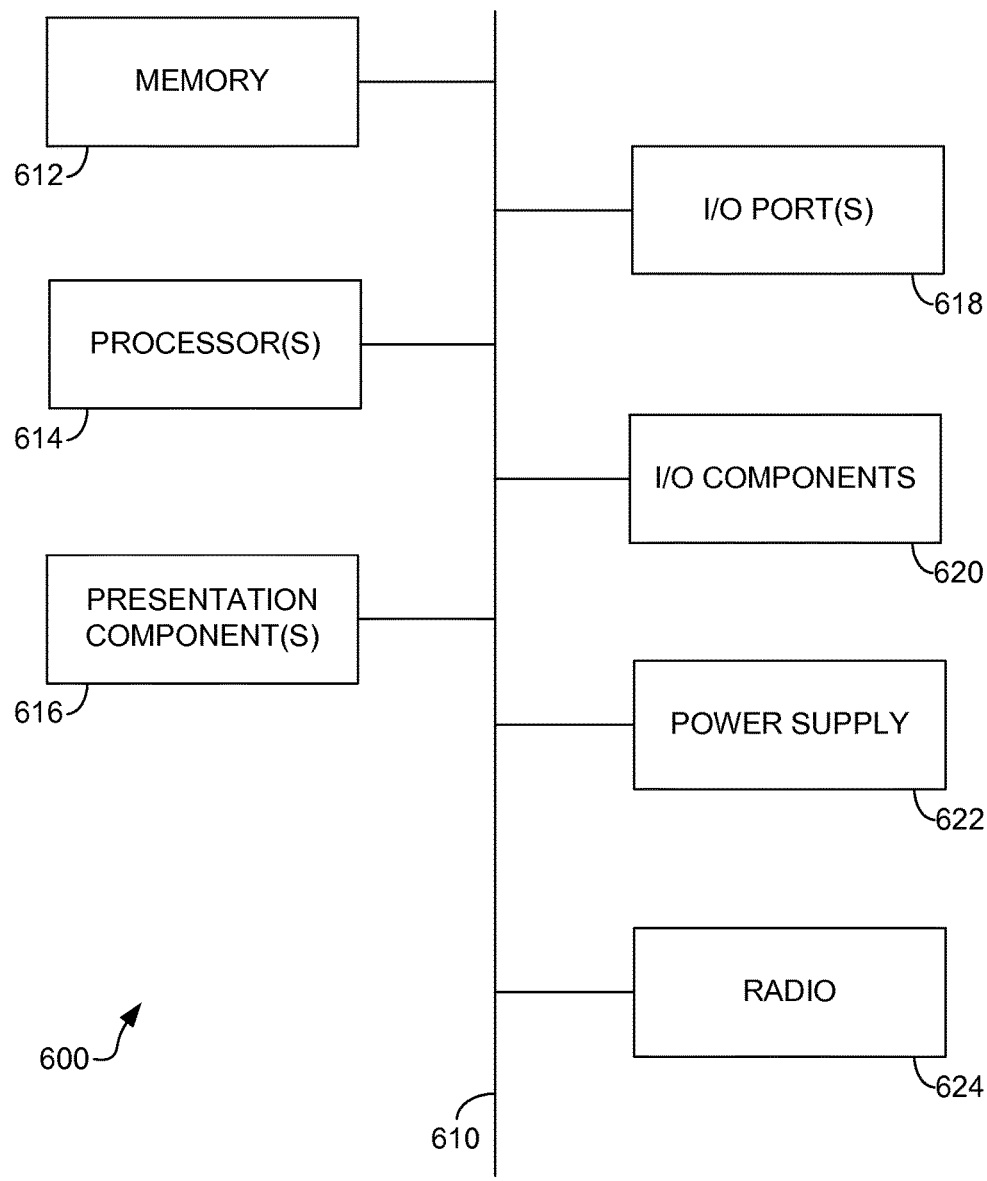
FIG. 6 is a block diagram of an exemplary computing environment suitable for implementing aspects of the invention.

Referring to the drawings in general, and initially to FIG. 6 in particular, an exemplary operating environment for implementing embodiments of the invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 6, computing device 600 includes a bus 610 that directly or indirectly couples the following devices: memory 612, one or more processors 614, one or more presentation components 616, input/output (I/O) ports 618, I/O components 620, an illustrative power supply 622, and radio 624. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component 620. Also, processors have memory. The inventors hereof recognize that such is the nature of the art, and reiterate that the diagram of FIG. 6 is merely illustrative of an exemplary computing device that can be used in connection with one or more embodiments of the invention. Distinction is not made between such categories as "workstation," "server," "laptop," "handheld device," etc., as all are contemplated within the scope of FIG. 6 and refer to "computer" or "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVDs) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory 612 may be removable, non-removable, or a combination thereof. Exemplary memory includes solid-state memory, hard drives, optical-disc drives, etc. Computing device 600 includes one or more processors 614 that read data from various entities such as bus 610, memory 612, or I/O components 620. Presentation component(s) 616 presents data indications to a person or other device. Exemplary presentation components 616 include a display device, speaker, printing component, vibrating component, etc. I/O ports 618 allow computing device 600 to be logically coupled to other devices including I/O components 620, some of which may be built in. Illustrative I/O components 620 include a microphone, joystick, game pad, satellite dish, scanner, printer, wireless device, etc.

Radio 624 transmits and receives radio communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices (not shown in FIG. 6). The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, 3G, 4G, 802.16 protocols, and such.

Aspects of the invention have been described to be illustrative rather than restrictive. It will be understood that certain features and subcombinations are of utility and may be employed without reference to other features and subcombinations. This is contemplated by and is within the scope of the claims.

The invention claimed is:

1. A computer-implemented method of expanding slot coverage for a domain-specific natural language understanding ("NLU") system, the method comprising:
   accessing a plurality of queries from labeled training data for a classifier used to recognize an intent within the domain-specific NLU, wherein the intent is associated with a slot of the domain-specific NLU;
   identifying a plurality of entities that occur in the slot of the domain-specific NLU within the plurality of queries;
   extracting, from a knowledge graph, a graph type for each of the plurality of entities to generate a plurality of candidate graph types for the slot of the domain-specific NLU, the candidate graph types comprising at least one compatible entity that is eligible for pairing with the recognized intent of the domain-specific NLU;
   calculating a correlation score for each graph type in the plurality of candidate graph types for pairing the at least one compatible entity with the recognized intent of the domain-specific NLU;
   assigning an individual graph type having the highest correlation score as the graph type the domain-specific NLU slot can accept;
   expanding slot coverage for the domain-specific NLU by validating the pairing of the at least one compatible entity associated with the assigned individual graph type with the recognized intent of the domain-specific NLU; and
   utilizing the validated pairing of the compatible entity and the recognized intent to interpret a natural language input of a query.

2. The method of claim 1, wherein the method further comprises associating a new graph type with the domain-specific NLU slot upon determining the new graph type is a child within the knowledge graph of the individual graph type.

3. The method of claim 1, wherein the method further comprises associating a new graph type with the domain-specific NLU slot upon determining the new graph type has an attribute within the knowledge graph of the individual graph type.

4. The method of claim 1, wherein the correlation score is calculated using a Term Frequency/Inverse document frequency ("TF/IDF") equation that uses graph types as terms and slots as documents.

5. The method of claim 4, wherein IDF is calculated to avoid down weighting a graph type that appears with many similar slots by determining a similarity between slots.

6. The method of claim 4, wherein TF is calculated using a function that gives a weight that is inversely proportional to a number of graph types appearing with each entity in the knowledge graph.

7. The method of claim 1, wherein the correlation score is calculated using a weighted summation.

8. The method of claim 1, wherein the method further comprises transferring an entity list from a second domain-specific natural language understanding ("NLU") system upon determining entities in the entity list are associated with a graph type that is compatible with the individual graph type.

9. One or more computer-storage media having computer-executable instructions embodied thereon that when executed by a computing device perform the method of expanding slot coverage for a domain-specific natural language understanding ("NLU") system, the method comprising:
   accessing a plurality of queries from labeled training data for a classifier used to recognize an intent within the domain-specific NLU, wherein the intent is associated with a slot of the domain-specific NLU;
   identifying a plurality of entities that occur in the slot of the domain-specific NLU within the plurality of queries;
   extracting, from a knowledge graph, a graph type for each of the plurality of entities to generate a plurality of candidate graph types for the slot of the domain-specific NLU, the candidate graph types comprising at least one compatible entity that is eligible for pairing with the recognized intent of the domain-specific NLU;
   calculating a correlation score for each graph type in the plurality of candidate graph types for pairing the at least one compatible entity with the recognized intent of the domain-specific NLU;
   assigning an individual graph type having the highest correlation score as the graph type the domain-specific NLU slot can accept;
   expanding slot coverage for the domain-specific NLU by validating the pairing of the at least one compatible entity associated with the assigned individual graph type with the recognized intent of the domain-specific NLU; and
   utilizing the validated pairing of the compatible entity and the recognized intent to interpret a natural language input of a query.

10. The method of claim 9, the method further comprising associating a new graph type with the domain-specific NLU slot upon determining the new graph type is a child within the knowledge graph of the individual graph type.

11. The method of claim 9, wherein the method further comprises associating a new graph type with the domain-specific NLU slot upon determining the new graph type has an attribute within the knowledge graph of the individual graph type.

12. The method of claim 9, wherein the correlation score is calculated using a Term Frequency/Inverse document frequency ("TF/IDF") equation that uses graph types as terms and slots as documents.

13. The method of claim 12, wherein IDF is calculated to avoid down weighting a graph type that appears with many similar slots by determining a similarity between slots.

14. The method of claim 12, wherein TF is calculated using a function that gives a weight that is inversely proportional to a number of graph types appearing with each entity in the knowledge graph.

15. The method of claim 9, wherein the correlation score is calculated using a weighted summation.

16. The method of claim 9, wherein the method further comprises transferring an entity list from a second domain-specific natural language understanding ("NLU") system upon determining entities in the entity list are associated with a graph type that is compatible with the individual graph type.

17. A computer-implemented method of expanding slot coverage for a domain-specific natural language understanding ("NLU") system, the method comprising:
  accessing a plurality of queries from training data to recognize an intent and a plurality of domain-specific entities, wherein the recognized intent and the plurality of domain-specific entities are associated with a slot of the domain-specific NLU;
  generating a plurality of candidate graph types for the slot of the domain-specific NLU by extracting, from a knowledge graph, a plurality of candidate graph types associated with each of the plurality of domain-specific entities, the candidate graph types comprising at least one compatible entity that is eligible for pairing with the recognized intent of the domain-specific NLU;
  assigning at least one of the plurality of candidate graph types as an individual graph type that the domain-specific NLU can accept based on a correlation score for each of the plurality of candidate graph types associated with the domain-specific entity, the individual graph type having the highest correlation score;
  expanding slot coverage of the domain-specific NLU by validating the pairing of the at least one compatible entity associated with the assigned graph type with the recognized intent of the domain-specific NLU; and
  utilizing the validated pairing of the compatible entity and the recognized intent to interpret a natural language input of a query.

18. The method of claim 17, wherein the method further comprises associating a new graph type with the domain-specific NLU slot upon determining the new graph type is a child within the knowledge graph of the individual graph type.

19. The method of claim 17, wherein the method further comprises associating a new graph type with the domain-specific NLU slot upon determining the new graph type has an attribute within the knowledge graph of the individual graph type.

20. The method of claim 18, wherein the correlation score is calculated using a weighted summation.

21. The method of claim 18, wherein the method further comprises transferring an entity list from a second domain-specific natural language understanding ("NLU") system upon determining entities in the entity list are associated with a graph type that is compatible with the individual graph type.

\* \* \* \* \*